(12) United States Patent
Stephens et al.

(10) Patent No.: US 8,901,211 B2
(45) Date of Patent: Dec. 2, 2014

(54) PREPARATION OF INDUSTRIAL ASPHALT

(75) Inventors: Keith Edward Stephens, Waxahachie, TX (US); Nicholas R. Soto, Waxahachie, TX (US); Denis Muki Tibah, Waxahachie, TX (US)

(73) Assignee: Building Materials Investment Corporation, Wilmington, DE (US)

( * ) Notice: Subject to any disclaimer, the term of this patent is extended or adjusted under 35 U.S.C. 154(b) by 112 days.

(21) Appl. No.: 13/478,236

(22) Filed: May 23, 2012

(65) Prior Publication Data
US 2012/0302673 A1 Nov. 29, 2012

Related U.S. Application Data

(60) Provisional application No. 61/490,829, filed on May 27, 2011.

(51) Int. Cl.
| | | |
|---|---|---|
| C08L 95/00 | (2006.01) | |
| C08L 53/00 | (2006.01) | |
| C08J 3/18 | (2006.01) | |
| E04D 1/20 | (2006.01) | |

(52) U.S. Cl.
CPC . *C08L 53/00* (2013.01); *E04D 1/20* (2013.01); *C08J 3/18* (2013.01); *C08J 2395/00* (2013.01); *C08L 95/00* (2013.01); *C08L 2555/84* (2013.01)
USPC .............................................. 524/64; 524/59

(58) Field of Classification Search
CPC ......... C08L 23/22; C08L 95/00; C08L 23/16; C08L 23/20; C08L 23/0815; C08L 23/0638
USPC .......................................................... 524/59
See application file for complete search history.

(56) References Cited

U.S. PATENT DOCUMENTS

| | | | | |
|---|---|---|---|---|
| 1,782,186 | A | 11/1930 | Abson | 208/5 |
| 2,200,914 | A | 7/1938 | Burk et al. | 208/4 |
| 2,179,208 | A | 11/1939 | Burk et al. | 196/174 |
| 2,287,511 | A | 6/1942 | Burk et al. | 208/5 |
| 2,370,007 | A | 2/1945 | Carr | 208/5 |
| 2,375,117 | A | 5/1945 | Lentz | 208/22 |
| 2,450,756 | A | 10/1948 | Hoiberg | 208/4 |
| 2,762,755 | A | 9/1956 | Kinnaird | 208/6 |
| 2,842,507 | A * | 7/1958 | Morris et al. | 524/71 |
| 3,126,329 | A | 3/1964 | Fort | 208/4 |
| 4,000,000 | A | 12/1976 | Mendenhall | 106/280 |
| 4,338,137 | A | 7/1982 | Goodrich | 106/284.2 |
| 4,544,411 | A | 10/1985 | Wombles et al. | 106/279 |
| 4,584,023 | A | 4/1986 | Goodrich | 106/273.1 |
| 4,659,389 | A | 4/1987 | Wombles et al. | 106/279 |
| 7,576,148 | B2 * | 8/2009 | Kluttz et al. | 524/68 |
| 7,901,563 | B2 | 3/2011 | Ruan et al. | 208/4 |

* cited by examiner

*Primary Examiner* — Vu A Nguyen
(74) *Attorney, Agent, or Firm* — Alvin T. Rockhill

(57) ABSTRACT

The present invention relates to a method for preparing an industrial asphalt comprising sparging an oxygen containing gas through an asphalt flux in the presence of 0.25 weight percent to about 12 weight percent of a highly saturated rubbery polymer at a temperature within the range of about 400° F. to about 550° F. for a period of time which is sufficient to increase the softening point of the asphalt flux to a value which is within the range of 185° F. to 250° F. and a penetration value of at least 15 dmm to produce the industrial asphalt. The highly saturated rubbery polymer can be a styrene-ethylene/butylene-styrene block copolymer rubber or a highly saturated styrene-ethylene/propylene-styrene block copolymer rubber.

18 Claims, 3 Drawing Sheets

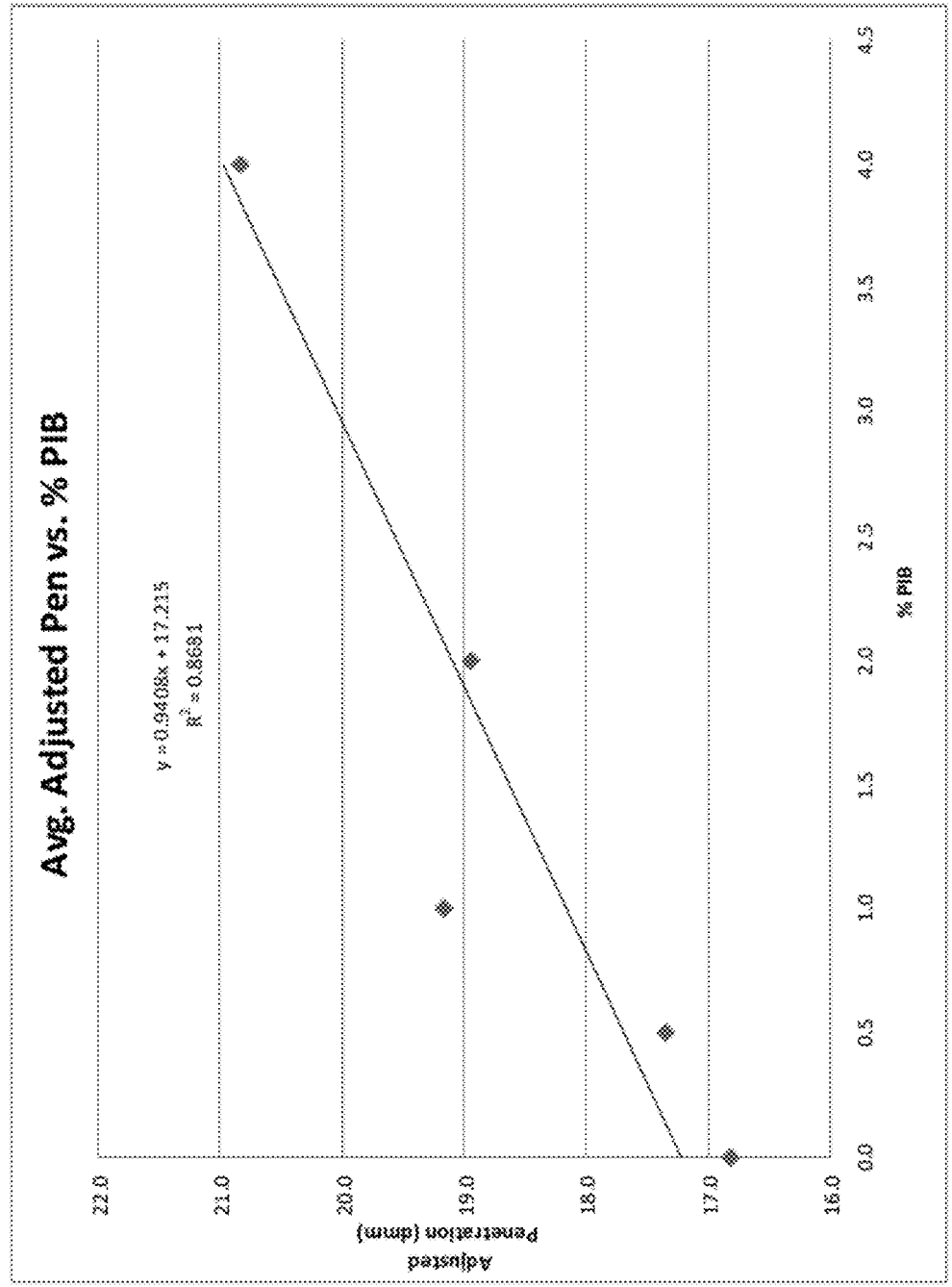

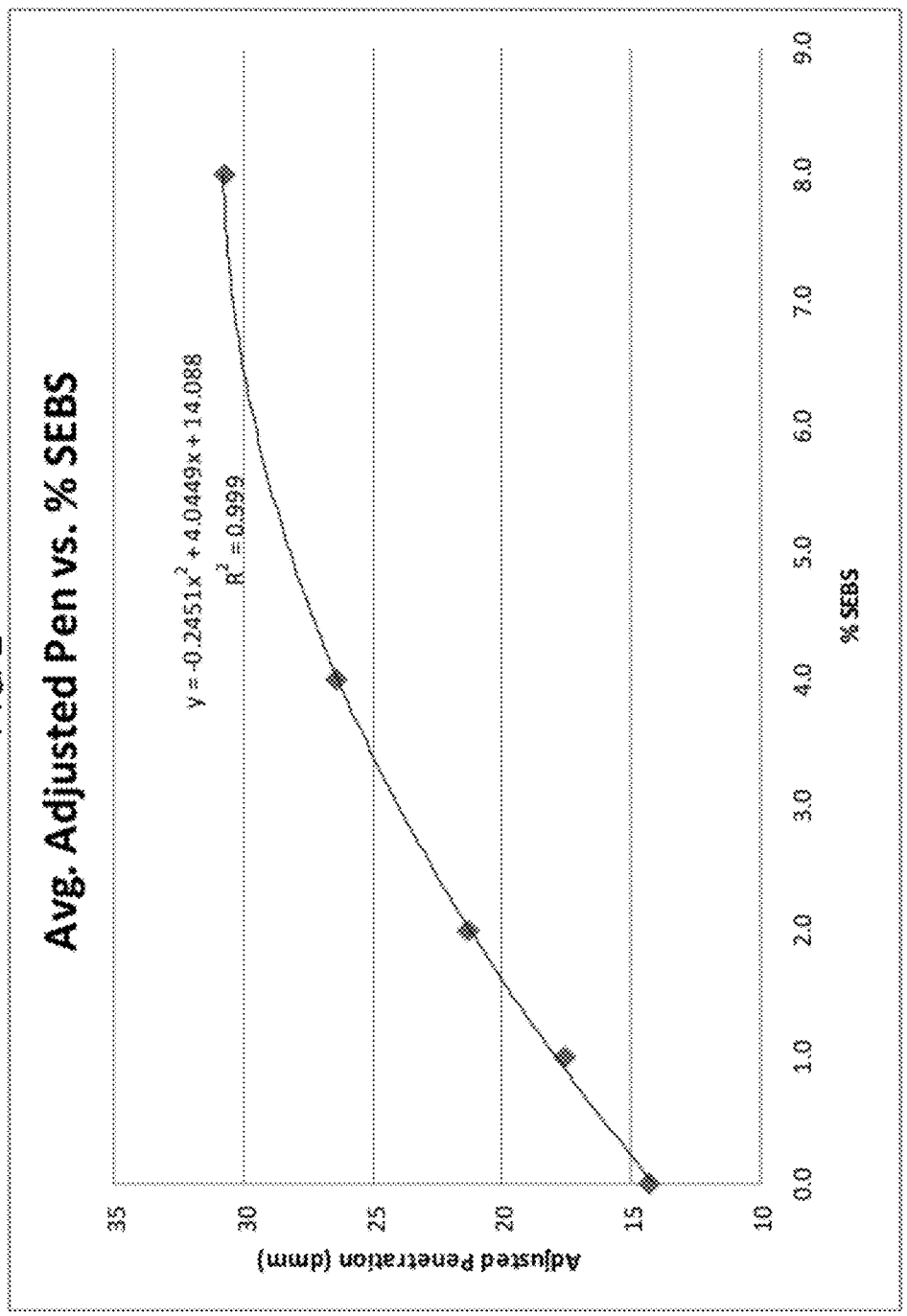

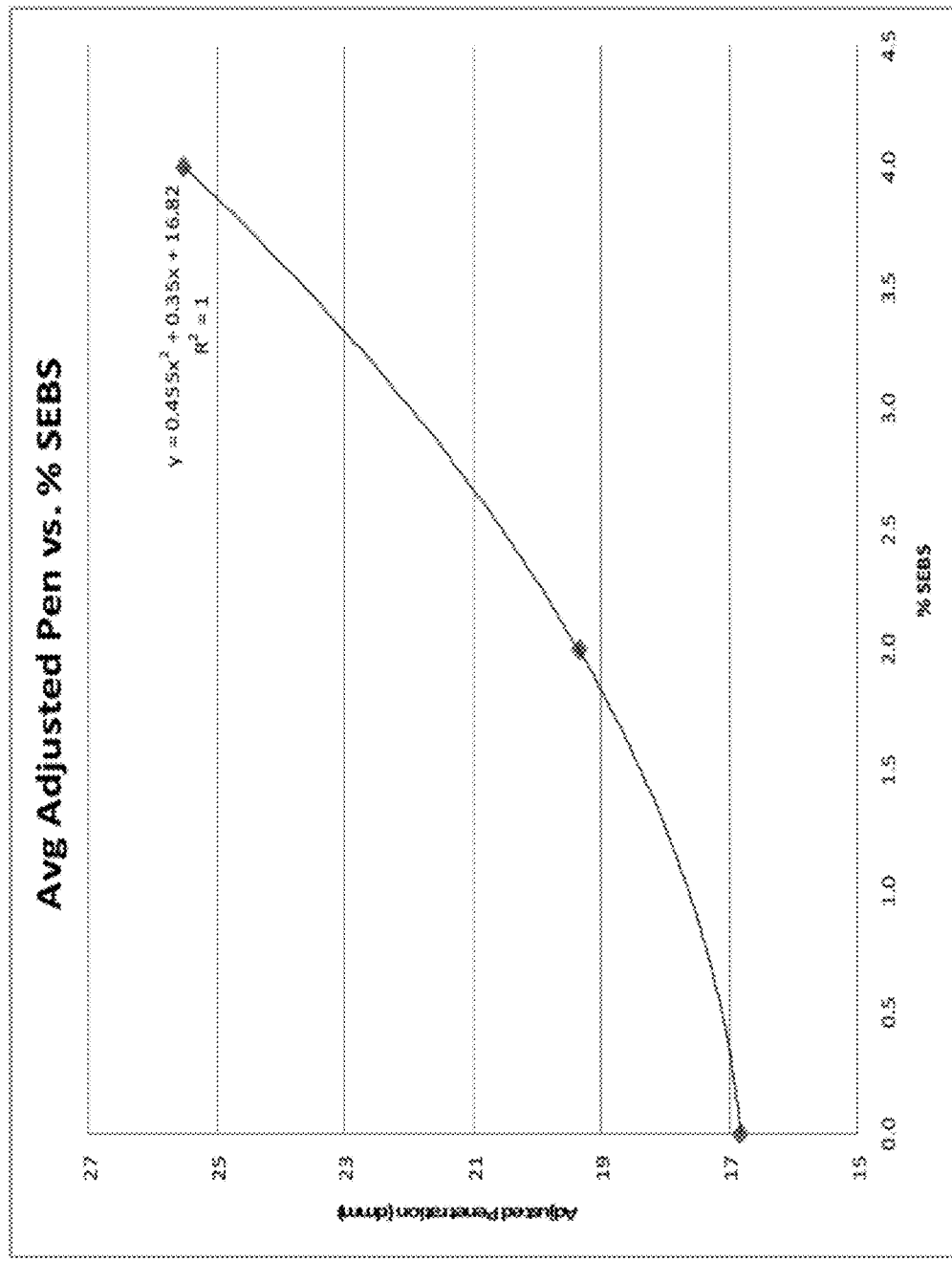

PREPARATION OF INDUSTRIAL ASPHALT

This application claims the benefit of U.S. Provisional Patent Application Ser. No. 61/490,829, filed on May 27, 2011. The teachings of U.S. Provisional Patent Application Ser. No. 61/490,829 are incorporated by reference herein in their entirety.

BACKGROUND OF THE INVENTION

Asphalt offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux is essentially the residue that remains after gasoline, kerosene, diesel fuel, jet fuel, and other hydrocarbon fractions have been removed during the refining of crude oil. In other words, asphalt flux is the last cut from the crude oil refining process.

To meet performance standards and product specifications, asphalt flux that is recovered from refining operations is normally treated or processed to attain desired physical characteristics and to attain uniformity. For instance, asphalt that is employed in manufacturing roofing products has to be treated to meet the special requirements demanded in roofing applications. More specifically, in the roofing industry it is important to prevent asphaltic materials from flowing under conditions of high temperature such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

To attain the required level of stiffness and increased softening point that is demanded in roofing applications the asphalt flux is typically treated by an air blowing process. In such air blowing techniques, air is blown through the asphalt flux for a period of about 2 to about 8 hours while it is maintained at an elevated temperature which is typically within the range of 400° F. (204° C.) to 550° F. (288° C.). The air blowing process optimally results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a catalyst is added for an additional treatment period of 20 to 300 minutes at a temperature of 225° F. (107° C.) to 450° F. (232° C.). Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate $CuSO$, zinc chloride $ZnCl_2$, phosphorous sesquesulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

U.S. Pat. No. 2,179,208 discloses a process for manufacturing asphalts which comprises the steps of air-blowing a petroleum residuum in the absence of any added catalysts while maintaining the temperature at about 149° C. to 260° C. (300° F. to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing with air can then be continued in the presence of the polymerizing catalyst.

U.S. Pat. No. 2,287,511 discloses an asphalt manufacturing process which involves heating a residuum in the presence of the following catalysts: ferric chloride, aluminum bromide, aluminum chloride, aluminum iodide; halides of copper, tin, zinc, antimony, arsenic, boron, titanium; hydroxides of sodium and potassium; calcium oxides, sodium carbonate, and metallic sodium. These catalysts are described as being present in the asphalt composition in the absence of any injected air. However, air may be injection prior to the addition of the above-cited polymerizing catalysts, but no air is injected when the catalysts have been added to the composition.

U.S. Pat. No. 4,000,000 describes a process for recycling asphalt-aggregate compositions by heating and mixing them with a desired amount of petroleum hydrocarbons containing at least 55% aromatics.

U.S. Pat. No. 2,370,007 reveals a process for oxidizing asphalt which involves air blowing a petroleum oil in the presence of a relatively small amount of certain types of catalysts. These catalysts are organic complexes of metallic salts. Examples of organic complexes of metallic salts that can be used include those obtained from sludges recovered in treating petroleum fractions with metallic salts, such as metallic halides, carbonates and sulfates. The sludge obtained in treating a cracked gasoline with aluminum chloride is disclosed as being particularly suitable in accelerating the oxidation reaction and in producing an asphalt of superior characteristics. The hydrocarbon stocks from which the organic complex of metallic salts may be produced are described as including various hydrocarbon fractions containing hydrocarbons which are reactive with the metallic salts, such as those containing olefinic hydrocarbons. Sludges obtained by treating olefins with aluminum chloride are also described as being useful in the process of this 1943 patent. Other sludges that are identified as being particularly useful can be obtained in the isomerization of hydrocarbons such as butane, pentane and naphtha in the presence of aluminum chloride. These sludges can be obtained by the alkylation of isoparaffins with olefins in the presence of such alkylating catalysts, such as boron trifluoride and the like.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $H_m R_n PO_4$.

In general the air blowing techniques described in the prior art share the common characteristic of both increasing the softening point and decreasing the penetration value of the asphalt flux being treated. In other words, as the asphalt flux is air blown, its softening point increases and its penetration value decreases over the duration of the air blowing procedure. It has been the conventional practice to air blow asphalt flux for a period of time that is sufficient to attain the desired softening point and penetration value. However, in the case of some asphalt fluxes, air blowing to the desired softening point using conventional procedures results in a penetration value which is too low to be suitable for utilization in roofing applications. These asphalt fluxes are called "hard asphalt fluxes". In other words, hard asphalt fluxes cannot be air blown using conventional procedures to a point where both the required softening point and penetration values are attained. Accordingly, there is a need for techniques that can be used to air blow hard asphalt flux to both a softening point which is within the range of 185° F. (85° C.) to 250° F. (121° C.) and a penetration value at 77° F. (25° C.) of above 15 dmm.

U.S. Pat. No. 4,659,389 and U.S. Pat. No. 4,544,411 disclose the preparation of satisfactory asphaltic roofing fluxes from otherwise unsatisfactory fluxes which involves the addition of asphaltenes, and saturates in quantities which satisfy certain specified conditions. Air oxidation of the flux is described in these patents as being surprisingly accelerated by the addition of highly branched saturates, especially in the presence of a carbonate oxidation catalyst. Some examples of saturates which are described in these patents as being useful in the method described therein include slack wax, petrolatums, hydrocarbyl species, and mixtures thereof.

U.S. Pat. No. 7,901,563 discloses a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm at 77° F. (25° C.) to produce the industrial asphalt. The techniques disclosed in this patent is useful in that it can be used to increase the softening point of hard asphalt flux to a commercially desirable level while maintaining the penetration value of the asphalt above 15 dmm at 77° F. (25° C.). Accordingly, this technique can be used to produce industrial asphalt having a desirable softening point and penetration value using hard asphalt flux as the starting material.

SUMMARY OF THE INVENTION

This invention is based upon the discovery that highly saturated rubbery polymers can be used to alter the relationship between the change in softening point and the change in penetration value that is normally attained by the conventional air blowing of asphalt flux. It has been found that highly saturated rubbery polymers, such a polyisobutylene (PIB) and styrene-ethylene/butylene-styrene block copolymers (SEBS) can be added to hard asphalt flux so that the hard asphalt flux can be air blown to produce industrial asphalt which has a softening point within the range of 185° F. (85° C.) to 250° F. (121° C.) and a penetration value at 77° F. (25° C.) of above 15 dmm. The highly saturated rubbery polymer will typically be added to the hard asphalt flux prior to air blowing or early in the air blowing procedure.

In some cases the blow loss (asphalt lost during the air blowing procedure) experienced in attaining a given target softening point is also reduced by utilizing the technique of this invention. This accordingly results in less material loss and better process efficiency. In some cases, the air blow time required to produce industrial asphalt having a desired softening point is also reduced. Accordingly, utilizing the technique of this invention can increase the capacity of air blowing units and also reduces the energy consumption required to produce industrial asphalt. Accordingly, the technique of this invention can be used to lower costs and/or to utilize starting materials that may be more readily available, such as hard asphalt flux. It can also reduce the environmental impact of the air blowing procedure.

The subject invention more specifically discloses a method for preparing an industrial asphalt comprising sparging an oxygen containing gas through an asphalt flux in the presence of a highly saturated rubbery polymer at a temperature within the range of about 400° F. to about 550° F. for a period of time which is sufficient to increase the softening point of the asphalt flux to a value which is within the range of 185° F. to 250° F. and a penetration value of at least 15 dmm to produce the industrial asphalt.

The present invention also reveals a method for preparing an industrial asphalt comprising (1) heating an asphalt flux to a temperature of at least 120° F. (49° C.) to produce a hot asphalt flux, (2) adding from about 0.1 weight percent to about 10 weight percent of a highly saturated rubbery polymer to the hot asphalt flux, (3) mixing the highly saturated rubbery polymer throughout the hot asphalt flux to prepare a highly saturated rubbery polymer modified asphalt flux, (4) heating the highly saturated rubbery polymer modified asphalt flux to a temperature which is within the range of about 400° F. (204° C.) to about 550° F. (288° C.) to produce a hot highly saturated rubbery polymer modified asphalt flux, (5) sparging an oxygen containing gas through the hot highly saturated rubbery polymer modified asphalt flux for a period of time which is sufficient to increase the softening point of the highly saturated rubbery polymer modified asphalt flux to a value which is within the range of 185° F. (85° C.) to 250° F. (121° C.) and a penetration value of at least 15 dmm to produce the industrial asphalt.

The present invention also discloses an industrial asphalt composition which is comprised of (1) asphalt and (2) from about 0.1 weight percent to about 12 weight percent of a A-B-A block copolymer rubber having A blocks which are comprised of repeat units which are derived from at least one vinyl aromatic monomer and a B block which is comprised of isobutylene repeat units, wherein the industrial asphalt composition has a softening point which is within the range of 185° F. (85° C.) to 250° F. (121° C.) and a penetration value of at least 15 dmm.

BRIEF DESCRIPTION OF THE DRAWINGS

FIG. 1 is a graph wherein the adjusted penetration values attained in Examples 1-12 are plotted as a function of the level of the highly saturated rubbery polymer (polyisobutylene) which was utilized as an air blow modifier.

FIG. 2 is a graph wherein the adjusted penetration values attained in Examples 13-22 are plotted as a function of the level of the highly saturated rubbery polymer (SEBS) which was utilized as an air blow modifier.

FIG. 3 is a graph wherein the adjusted penetration values attained in Examples 23-27 are plotted as a function of the level of the highly saturated rubbery polymer (SEBS) which was utilized as an air blow modifier.

DETAILED DESCRIPTION OF THE INVENTION

The process of this invention is particularly useful in treating hard asphalt flux to produce industrial asphalt that is useful in roofing applications, manufacturing rubber and plastics modification formulations, and a multitude of other applications. More specifically, hard asphalt flux can be treated by the process of this invention to produce industrial asphalt that has a softening point which is within the range of 185° F. (85° C.) to 250° F. (121° C.) and a penetration value of at least 15 dmm. In most cases, the industrial asphalt will have a penetration value which is within the range of 15 dmm to 35 dmm. Industrial asphalt that is made by the process of this invention for utilization in roofing applications will typically have a softening point which is within the range of 185° F. (85° C.) to 250° F. (121° C.) and a penetration value which is within the range of 15 dmm to 35 dmm. Industrial asphalt made by the process of this invention for roofing applications will preferably have a softening point which is within the range of 185° F. (85° C.) to 220° F. (104° C.) and a penetration value which is within the range of 15 dmm to 25 dmm. Industrial asphalt made by the process of this invention for roofing applications will more preferably have a softening point which is within the range of 190° F. (88° C.) to 210° F. (99° C.) and a penetration value which is within the range of 15 dmm to 25 dmm. In some cases the industrial asphalt will have a softening point which is within the range of 190° F. (88° C.) to 215° F. (102° C.) and a penetration value which is within the range of 15 dmm to 20 dmm.

The asphalt flux is normally the petroleum residue from a vacuum distillation column used in refining crude oil. Such asphalt flux typically has a softening point which is within the range of 60° F. to 130° F. (16° C. to 54° C.) and more typically has a softening point which is within the range of 80° F. to 110° F. (27° C. to 43° C.). It also typically has a penetration value of at least 150 dmm and more typically has a penetration value of at least 200 dmm at 77° F. (25° C.). The asphaltic material used as the starting material can also be solvent extracted asphalt, naturally occurring asphalt, or synthetic asphalt. Blends of such asphaltic materials can also be treated by the process of this invention. The asphalt flux can also include polymers, recycled tire rubber, recycled engine oil residue, recycled plastics, softeners, antifungal agents, biocides (algae inhibiting agents), and other additives. Tar and pitch can also be used as the starting material for treatment by the technique of this invention.

The hard asphalt flux is characterized in that it cannot be air blown to attain both a softening point which is within the range of 185° F. (85° C.) to 250° F. (121° C.) and a penetration value of at least 15 dmm. However, it should be understood that the process of this invention is also applicable to the treatment of virtually any asphaltic materials in addition to hard asphalt flux. The technique of this invention is of particular value in the treatment of hard asphalt flux that is impossible to air blow utilizing standard air blowing methods into industrial asphalt having properties suitable for use in roofing applications.

In the first step of the process of this invention the asphalt flux, typically a hard asphalt flux, is heated to a temperature which is within the range of about 120° F. (49° C.) to 550° F. (288° C.) to produce a hot asphalt flux. In any case, the asphalt flux will be heated to a temperature which is sufficient to provide for good mixing. In many cases the asphalt flux will be heated to a temperature which is within the range of about 200° F. (93° C.) to about 500° F. (260° C.). The asphalt flux will frequently be heated to a temperature which is within the range of about 250° F. (121° C.) to about 400° F. (204° C.) or 450° F. (232° C.) to produce the hot asphalt flux at which point the highly saturated rubbery polymer is added. Then the asphalt flux is heated to the desired air blowing temperature which is typically within the range of 400° F. (204° C.) to 550° F. (288° C.) and more typically within the range of 450° F. (232° C.) to 525° F. (274° C.). It is often preferred to utilize an air blowing temperature which is within the range of 475° F. (246° C.) to 525° F. (274° C.). In any case the hot asphalt flux containing the saturated rubbery polymer is then air blown to the desired softening point which is typically within the range of 185° F. (85° C.) to 250° F. (121° C.) by blowing an oxygen containing gas through the hot asphalt flux for the time required to attain the desired softening point while maintaining a penetration value of at least 15 dmm to produce the industrial asphalt.

The oxygen containing gas (oxidizing gas) is typically air. The air can contain moisture and can optionally be enriched to contain a higher level of oxygen. For example, oxygen enriched air containing from about 25 weight percent to about 35 weight percent oxygen and about 65 weight percent to about 75 weight percent nitrogen can be employed. Chlorine enriched air or pure oxygen can also be utilized in the air blowing step. For instance, chlorine enriched air containing from about 15 weight percent to about 25 weight percent oxygen, about 5 weight percent to about 15 weight percent chlorine, and from about 60 weight percent to about 80 weight percent nitrogen can be utilized as the oxidizing gas.

The duration of the air blow will, of course, be sufficient to attain the desired final softening point and with typically be within the range of about 1 hour to about 30 hours. Air blow can be performed either with or without a conventional air blowing catalyst. However, air blowing catalysts are typically added to the asphalt flux to reduce the air blow time needed to attain the desired softening point. Some representative examples of air blowing catalysts include ferric chloride ($FeCl_3$), phosphorous pentoxide ($P_2O_5$), aluminum chloride ($AlCl_3$), boric acid ($H_3BO_3$), copper sulfate ($CuSO_4$), zinc chloride ($ZnCl_2$), phosphorous sesquesulfide ($P_4S_3$), phosphorous pentasulfide ($P_{255}$), phytic acid ($C_6H_6[OPO\text{---}(OH)_2]_6$), and organic sulfonic acids. In any case, the duration of the air blow will more typically be within the range of about 2 hours to about 20 hours and is more typically be within the range of about 4 hours to about 10 hours or 12 hours. The air blowing step will preferably take about 2 hours to about 8 hours and will more typically take about 3 hours to about 6 hours.

Typically about 0.25 weight percent to about 12 weight percent of the highly saturated rubbery polymer will be added to the asphalt flux. More typically, about 0.25 weight percent to about 10 weight percent of the highly saturated rubbery polymer will be added to the asphalt flux. Generally, about 0.5 weight percent to about 8 weight percent of the highly saturated rubbery polymer will be added to the asphalt flux. More generally, about 0.5 weight percent to about 5 weight percent of the highly saturated rubbery polymer will be added to the asphalt flux. It is generally preferred for the highly saturated rubbery polymer to be present in the asphalt flux at a level which is within the range of about 1 weight percent to about 4 weight percent with levels within the range of about 1 weight percent to about 2 weight percent being most preferred. The highly saturated rubbery polymer will typically be mixed into the asphalt flux in the form of a liquid in the case of rubbery polymer like PIB or in the form of a powder in the case of solid rubbery polymers, such as SEBS and SEPS. This mixing can normally be accomplished by sparging a gas (either an inert gas or an oxygen containing gas) through the asphalt flux to thoroughly mix the highly saturated rubber into it. Accordingly, it is generally not necessary to utilizing a Seifer mill or other similar equipment to generate high shear conditions in order to attain adequate mixing of the highly saturated rubbery polymer throughout the asphalt flux.

The asphalt flux which is air blown in accordance with this invention will typically be essentially free of sodium carbonate and in most cases will be void of sodium carbonate. The ratio of asphaltenes plus polars to saturates in the asphalt flux which is air blown in accordance with this invention can be greater than 2.5 and will frequently be greater than 2.8, 2.9, or even 3.0. Thus, the asphalt flux which is air blown in accordance with this invention will normally satisfy the equation (A+P)/(S)>2.5, wherein "A" represents the weight of asphaltenes in the flux, wherein "P" represents the weight of polars in the flux, and wherein "S" represents the weight of saturates in the flux, and wherein the symbol ">" means greater than. In many cases, (A+P)/(S) will be greater than 2.7, 2.9, 3.0 or even 3.2.

The method used to determine the asphaltene, polar, aromatic and saturate content of the roofing fluxes is the clay-gel adsorption chromatographic method of ASTM D-2007. The first step of the clay-gel analysis involves dissolving of the sample to be analyzed into 40 milliters of pentane for each gram of the sample. The pentane insoluble fraction of the asphalt which is removed by filtration is called the "asphaltenes". The pentane soluble part of the asphalt, which is called the "maltenes" is eluted through a separable colinear two part column apparatus in which the top column is packed with attapulgus clay and the bottom column is packed with silica gel and attapulgus clay. The two columns are eluted with pentane until 250 ml of pentane eluent has been collected. At this time, the elution of the columns with pentane is stopped, the pentane is evaporated and the residual material obtained is designated as the saturates.

The next step in the clay-gel analysis is to separate the two part column. The attapulgus clay (top) column is eluted with a 50:50 (by volume) mixture of benzene and acetone. The elution is continued until the benzene and acetone mixture emerging from the end of the column is colorless. At this time, the elution is stopped, the benzene-acetone mixture collected is evaporated and the residual material is designated as polars. At this point the asphaltenes, saturates and polars have been determined directly so the aromatics are determined by difference to complete the clay-gel analysis. Other methods which will give results similar to the clay-gel analysis are liquid chromatographic methods, such as the Corbett analysis, ASTM D-4124, and many high performance liquid chromatographic methods.

At least 95 weight percent of the repeat units in the highly saturated rubbery polymers used in the practice of this invention will be totally saturated (contain no double bonds). It is typically preferred for at least 97 weight percent and more preferable 98 weight percent of the repeat units in the highly saturated rubbery polymers to be totally saturated. In many cases the highly saturated rubbery polymers used in the practice of this invention will be completely saturated (contain no double bonds). Some representative examples of highly saturated rubbery polymers that can be used include polyisobutylene (PIB), butyl rubber, styrene-ethylene/butylene-styrene block polymers (SEBS), styrene-ethylene/propylene-styrene block polymers (SEPS), ethylene-propylene rubber, hydrogenated nitrile rubber, and the like. The highly saturated rubbery polymer will preferably be of a relatively high molecular weight and will preferably be primarily linear (contain less than 2% and typically less than 1% carbon atoms which are branch points for polymer chains that contain at least 3 carbon atoms), based upon the total weight of the polyisobutylene polymer.

The polyisobutylene used in the practice of this invention is a homopolymer of isobutylene and is of the formula:

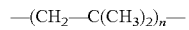

wherein n is an integer that represents the number of isobutylene repeat units in the polymer. The polyisobutylene will typically be a highly linear polymer will accordingly contain less than 2 percent and preferably contains less than 1 percent carbon atoms which act as branch points for polymer side chains that contain at least 3 carbon atoms, based upon the total weight of the polyisobutylene polymer. The butyl rubber that can be used in the practice of this invention is a copolymer of isobutylene and isoprene that contains about 98 weight percent to 99 weight percent isobutylene and about 1 weight percent to about 2 weight percent isoprene. Butyl rubber is accordingly of the formula:

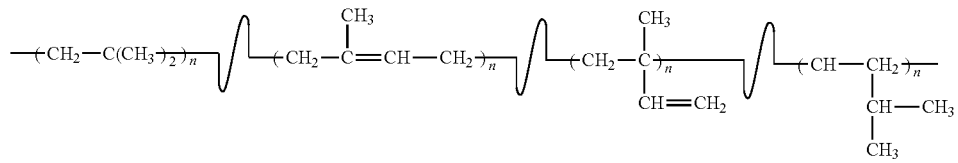

wherein n represents the number of polyisobutylene repeat units, 1,4-polyisoprene repeat units, 1,2-polyisoprene repeat units, and 3,4-polyisoprene repeat units in the butyl rubber, and wherein ∥ indicates that the repeat units in the polymer can be distributed in any order, such as in a random order. In many cases the highly saturated polymers of this invention, such as SEBS block copolymers, will contain repeat units which are of the formula:

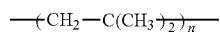

wherein n is an integer representing the number of isobutylene repeat units in the polymer.

The method of this invention can be employed in making novel industrial asphalt compositions which is comprised of (1) asphalt and (2) from about 0.1 weight percent to about 12 weight percent of a A-B-A block copolymer rubber having A blocks which are comprised of repeat units which are derived from at least one vinyl aromatic monomer and a B block which is comprised of isobutylene repeat units, wherein the industrial asphalt composition has a softening point which is within the range of 185° F. to 250° F. and a penetration value of at least 15 dmm. The A-B-A block copolymer will typically be present in the industrial asphalt at a level which is within the range of about 0.25 weight percent to about 8 weight percent. The A-B-A block copolymer rubber in these compositions has A blocks which are comprised of repeat units which are derived from at least one vinyl aromatic monomer. The vinyl aromatic monomer will typically contain from 8 to 20 carbon atoms. In most cases the vinyl aromatic monomer will contain from 8 to 14 carbon atoms. Some representative examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, 4-phenylstyrene, 3-phenylstyrene and the like. The B block is comprised of isobutylene repeat units and can optionally further include repeat units that are derived from α-olefin monomers containing from 2 to about 6 carbon atoms, such as ethylene, propylene, 1-butene, 1-pentene, and the like. Such industrial asphalt compositions typically have a flash point which is higher than about 550° F. (288° C.) and generally have a flash point which is within the range of 550° F. (288° C.) to about 700° F. (371° C.). In many cases the industrial asphalt will have a flash point which is within the range of 550° F. (288° C.) to about 625° F. (329° C.).

The industrial asphalt made can be used in making roofing products and other industrial products using standard procedures. For instance, the industrial asphalt can be blended with fillers, stabilizers (like limestone, stonedust, sand, granule, etc.), polymers, recycled tire rubber, recycled engine oil residue, recycled plastics, softeners, antifungal agents, biocides (algae inhibiting agents), and other additives.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-12

In this series of experiments samples of asphalt flux having a softening point of 93° F. (34° C.) by the ring and ball method according to ASTM D36/D36M (standard test method for softening point of bitumen), a penetration value of over 200 dmm measured at 77° F. (25° C.), a viscosity of 615 cP measured at 210° F. (100° C.), and a COC flash point of over 620° F. (327° C.) was heated in a laboratory oven set at 400° F. (204° C.). Once the flux was heated, the desired amount was poured into the top of a laboratory blow still. When the flux was added to the blow still its temperature was within the range of 200° F. to 250° F. (93° C. to 121° C.). Two blow stills were used in this series of experiments. One blow still had a total capacity of approximately 1 gallon (3.78 liters) and the other blow still had a total capacity of approximately 0.57 gallons (2.16 liters). The stills were filled to about 60% of their capacity with the samples of asphalt flux. More specifically, the 1 gallon blow still was filled with about 2000 grams of material and the 0.57 gallon blow still was filled with about 1190 grams of material.

The desired amount of highly saturated rubbery polymer (PIB) was then added to the top of the hot asphalt flux in the blow stills. The PIB was in the form of a highly viscous liquid. The blow still lids were securely fastened and the blow still was connected to power and an air source. The external band heaters on the blow stills were also turned on. An air flow rate of 1 liter per minute was established when the blow stills reached a temperature of 300° F. (149° C.). This air flow created agitation which was sufficient to mix the PIB into the asphalt flux and allowed for even heating of the blends in the blow stills. The air pressure into the system was regulated to 20 pounds per square inch (0.138 megapascals).

Full air flow was established when the blow still temperatures reached within 2% of the 500° F. (260° C.) target air blow temperature. This point was considered to be the start of the oxidation. The full air flow rate for the large blow still was set at 20 liters per minute and the full air flow rate for the small blow still was set at 12 liters per minute. During the air blow samples of the asphalt compositions were periodically taken to determine softening points. After the target softening points were achieved the air blowing (oxidation) was completed and the blend was drained from the blow still. Final softening points, penetration values, and viscosities were then determined for each of the asphalt samples. For purposes of this invention, asphalt softening points were measured following ASTM D3461 (Standard Test Method for Softening Point of Asphalt and Pitch (Mettler Cup-and-Ball Method)), asphalt penetrations were measured following ASTM D5 (Standard Test Method for Penetration of Bituminous Materials), viscosities were determined according to ASTM D4402 (Standard Test Method for Viscosity Determination of Asphalt at Elevated Temperatures Using a Rotational Viscometer), flash points were determined according to ASTM D92 (Standard Test Method for Flash and Fire Points by Cleveland Open Cup Tester), stain index was determined according to ASTM D2746 (Standard Test Method for Staining Tendency of Asphalt), and blow loss was calculated on the basis of the mass balance of the system.

PIB was evaluated as an air blow modifier in Examples 1-12. The percentage of highly saturated rubbery polymer added to the samples of asphalt flux, the level of blow loss experienced, and physical properties of the air blown asphalt samples made in this series of experiments are reported in Table 1.

TABLE 1

| Example | % PIB | SP[1], °F. | Viscosity[2] cP | PEN[3], dmm | FP[4], °F. | Blow Time, min. | Blow Loss, % | Adjusted PEN[5], dmm | Stain |
|---|---|---|---|---|---|---|---|---|---|
| 1 | 0.0 | 207.1 | 242.0 | 16.3 | 615 | 270 | 2.0 | 16.1 | 7 |
| 2 | 0.0 | 210.0 | 302.9 | 16.3 | 610 | 225 | 3.0 | 16.7 | 11 |
| 3 | 0.0 | 212.7 | 250.4 | 16.7 | >620 | 202 | 4.0 | 17.6 | 9 |
| 4 | 0.5 | 209.5 | 211.5 | 17.8 | 615 | 222 | 3.1 | 18.1 | 9 |
| 5 | 0.5 | 204.5 | 202.7 | 17.3 | >620 | 225 | 2.7 | 16.6 | 9 |
| 6 | 1.0 | 209.7 | 281.9 | 19.1 | NA | 300 | 11.7 | 19.4 | 10 |
| 7 | 1.0 | 212.5 | 265.1 | 18.5 | 610 | 300 | 2.2 | 19.4 | 9 |
| 8 | 1.0 | 206.4 | 207.0 | 19.0 | >620 | 265 | 2.2 | 18.7 | 10 |
| 9 | 2.0 | 215.4 | 262.0 | 17.1 | 590 | 205 | 7.5 | 18.6 | 11 |
| 10 | 2.0 | 208.1 | 206.0 | 19.3 | 585 | 148 | 9.5 | 19.3 | 11 |
| 11 | 4.0 | 212.3 | 212.0 | 19.8 | 600 | 240 | 3.7 | 20.7 | 9 |
| 12 | 4.0 | 208.1 | 204.0 | 21.0 | NA | 240 | 3.4 | 21.0 | 9 |

[1] Softening Point
[2] Viscosity was determined according to ASTM D4402 at 400° F. (204° C.)
[3] Penetration was measured following ASTM D5 (Standard Test Method for Penetration of Bituminous Materials) at 77° F. (25° C.)
[4] COC Flash Point
[5] Adjusted Penetration values were determined by interpolation or extrapolation to a softening point of 208° F. (98° C.)

Examples 1-3 were conducted as a control with no PIB being added to the asphalt flux. In Examples 1-3 the average adjusted penetration was 16.8 dmm. In Examples 4-5 the PIB was included at a level of 0.5% and the average adjusted penetration was 17.4 dmm. In Examples 6-8 the PIB was included at a level of 1.0% and the average adjusted penetration was 19.2 dmm. In Examples 9-10 the PIB was included at a level of 2.0% and the average adjusted penetration was 19.0 dmm. In Examples 11-12 the PIB was included at a level of 4.0% and the average adjusted penetration was 20.8 dmm. It was accordingly determined that average adjusted penetration values to a softening point of 208° F. (98° C.) increased with the level of PIB present during the air blowing procedure. This relationship is also shown in FIG. 1 where adjusted penetration values are plotted as a function of the level of PIB.

Examples 13-22

SEBS was evaluated as an air blow modifier in this series of experiments using the same equipment and general procedure as was used in Examples 1-13 except that an asphalt flux from a different source having a softening point of 104° F. (40° C.) by the ring and ball method according to ASTM D36/D36M (standard test method for softening point of bitumen), a penetration value of 182 dmm measured at 77° F. (25° C.), a viscosity of 2046 cP measured at 210° F. (100° C.), and a COC flash point of over 620° F. (327° C.) was substituted for the asphalt flux used in Examples 1-13 and except for the SEBS being substituted for the PIB evaluated in Examples 1-13. The SEBS evaluated in this series of experiments was in powder form. The percentage of highly saturated rubbery polymer (SEBS) added to the samples of asphalt flux, the level of blow loss experienced, and physical properties of the air blown asphalt samples made in this series of experiments are reported in Table 2.

TABLE 2

| Example | % SEBS | SP[1], °F. | Viscosity, cP[2] | Pen[3], dmm | FP[4], °F. | Blow Time, min. | Blow Loss, % | Adjusted Pen[5], dmm | Stain |
|---|---|---|---|---|---|---|---|---|---|
| 13 | 0.0 | 202.3 | 329.9 | 14.6 | >620 | 210 | 5.0 | 13.5 | NA |
| 14 | 0.0 | 205.1 | 349.9 | 15.1 | NA | 210 | 4.9 | 14.5 | NA |
| 15 | 0.0 | 204.7 | 350.9 | 15.5 | >620 | 188 | 3.1 | 14.8 | NA |
| 16 | 0.0 | 207.7 | 401.9 | 14.4 | 625 | 195 | 4.3 | 14.3 | NA |
| 17 | 1.0 | 209.8 | 412.0 | 17.8 | 595 | 190 | 4.5 | 18.2 | 4 |
| 18 | 1.0 | 204.7 | 405.0 | 18.3 | NA | 180 | 4.8 | 17.6 | NA |
| 19 | 1.0 | 202.7 | 367.0 | 17.9 | NA | 210 | 4.9 | 16.8 | NA |
| 20 | 2.0 | 205.4 | 451.0 | 21.8 | NA | 210 | 4.5 | 21.3 | N/A |
| 21 | 4.0 | 204.2 | 539.9 | 27.2 | NA | 240 | 4.6 | 26.4 | NA |
| 22 | 8.0 | 202.7 | 649.4 | 31.8 | NA | 140 | 3.1 | 30.7 | NA |

[1] Softening Point
[2] Viscosity was determined according to ASTM D4402 at 400° F. (204° C.)
[3] Penetration was measured following ASTM D5 (Standard Test Method for Penetration of Bituminous Materials) at 77° F. (25° C.)
[4] COC Flash Point
[5] Adjusted Penetration values were determined by interpolation or extrapolation to a softening point of 208° F. (98° C.)

Examples 13-16 were conducted as controls with no SEBS being added to the asphalt flux. In Examples 13-16 the average adjusted penetration was 14.3 dmm. In Examples 17-19 the SEBS was included at a level of 1.0% and the average adjusted penetration was 17.5 dmm. In Example 20 the SEBS was included at a level of 2.0% and the average adjusted penetration was 21.3 dmm. In Example 21 the SEBS was included at a level of 4.0% and the average adjusted penetration was 26.4 dmm. In Example 22 the SEBS was included at a level of 8.0% and the average adjusted penetration was 30.7. It was accordingly determined that average adjusted penetration values increased with the level of SEBS present during the air blowing procedure. This relationship is also shown in FIG. 2 where adjusted penetration values are plotted as a function of the level of SEBS.

Examples 23-27

SEBS was evaluated as an air blow modifier in this series of experiments using the same equipment and general procedure as was used in Examples 1-13 except for the SEBS being substituted for the PIB evaluated in Examples 1-13. The percentage of highly saturated rubbery polymer (SEBS) added to the samples of asphalt flux, the level of blow loss experienced, and physical properties of the air blown asphalt samples made in this series of experiments are reported in Table 3.

TABLE 3

| Example | % SEBS | $SP^1$, °F. | Viscosity, $cP^2$ | $Pen^3$ dmm | $FP^4$, °F. | Blow Time, min. | Blow Loss | Adjusted $Pen^5$, dmm | Stain |
|---|---|---|---|---|---|---|---|---|---|
| 23 | 0.0 | 207.1 | 242.0 | 16.3 | 615 | 270 | 2.0 | 16.1 | 7 |
| 24 | 0.0 | 210.0 | 302.9 | 16.3 | 610 | 225 | 3.0 | 16.7 | 11 |
| 25 | 0.0 | 212.7 | 250.4 | 16.7 | >620 | 202 | 4.0 | 17.6 | 9 |
| 26 | 2.0 | 208.2 | 269.9 | 19.3 | >620 | 300 | 2.1 | 19.3 | 9 |
| 27 | 4.0 | 208.1 | 292.0 | 25.2 | NA | 120 | 2.0 | 25.5 | 12 |

[1] Softening Point
[2] Viscosity was determined according to ASTM D4402 at 400° F. (204° C.)
[3] Penetration was measured following ASTM D5 (Standard Test Method for Penetration of Bituminous Materials) at 77° F. (25° C.)
[4] COC Flash Point
[5] Adjusted Penetration values were determined by interpolation or extrapolation to a softening point of 208° F. (98° C.)

Examples 23-25 were conducted as controls with no SEBS being added to the asphalt flux. In Examples 23-27 the average adjusted penetration was 16.8 dmm. In Example 26 the SEBS was included at a level of 2.0% and the average adjusted penetration was 19.3 dmm. In Example 27 the SEBS was included at a level of 4.0% and the average adjusted penetration was 25.5 dmm. It was accordingly again determined that average adjusted penetration values increased with the level of SEBS present during the air blowing procedure. This relationship is also shown in FIG. 3 where adjusted penetration values are plotted as a function of the level of SEBS.

Examples 28-32

SEBS and PIB were again evaluated as an air blow modifier in this series of experiments using the same equipment and general procedure as was used in Examples 1-13 except for the asphalt flux being a mixture containing 70% of a "soft" asphalt flux and 30% of a hard asphalt flux. The soft asphalt flux and the hard asphalt flux utilized in this series of experiments are characterized in Table 4.

TABLE 4

| Asphalt Flux | $SP^1$ (°F.) | Viscosity$^2$ | COC $FP^3$ | $PEN^4$ @ 77° F. | $PEN^5$ @ 32° F. |
|---|---|---|---|---|---|
| Soft | 93.5 | 601 cP | 610° F. | >200 | 104 dmm |
| Hard | 88.0 | 669 cP | >620° F. | >200 | 116 dmm |

[1] Softening Point
[2] Viscosity was determined according to ASTM D4402 at 400° F. (204° C.)
[3] COC Flash Point
[4] Penetration was measured following ASTM D5 (Standard Test Method for Penetration of Bituminous Materials) at 77° F. (25° C.)
[5] Penetration was measured following ASTM D5 (Standard Test Method for Penetration of Bituminous Materials) at 32° F. (0° C.)

The percentage of highly saturated rubbery polymer (SEBS or PIB) added to the samples of asphalt flux, the level of blow loss experienced, and physical properties of the air blown asphalt samples made in this series of experiments are reported in Table 5.

TABLE 5

| Ex | Modifier | $SP^1$, °F. | Viscosity, $cP^2$ | $Pen^3$ dmm | $FP^4$, °F. | Blow Time, min. | Blow Loss | Adjusted $Pen^5$, dmm | Stain |
|---|---|---|---|---|---|---|---|---|---|
| 28 | None | 208.1 | 252.7 | 19.0 | 615 | 285 | 4.1 | 19.0 | 12 |
| 29 | 1.5% SEBS | 208.1 | 309.9 | 22.6 | >620 | 232 | 3.7 | 22.6 | 11 |
| 30 | 1.5% SEBS | 209.7 | 322.4 | 21.9 | >620 | 261 | 3.8 | 22.2 | 9 |
| 31 | 2.6% PIB | 211.1 | 215.0 | 22.5 | >620 | 251 | 3.6 | 23.1 | — |
| 32 | 2.6% PIB | 211.9 | 225.0 | 21.9 | >620 | 245 | 3.9 | 22.7 | — |

[1] Softening Point
[2] Viscosity was determined according to ASTM D4402 at 400° F. (204° C.)
[3] Penetration was measured following ASTM D5 (Standard Test Method for Penetration of Bituminous Materials) at 77° F. (25° C.)
[4] COC Flash Point
[5] Adjusted Penetration values were determined by interpolation or extrapolation to a softening point of 208° F. (98° C.)

Example 28 was conducted as a control with no SEBS or PIB being added to the asphalt flux. In Examples 29 and 30 where SEBS was used as the modifier the average adjusted penetration was 22.4 dmm. In Examples 31 and 32 where SEBS was used as the modifier the average adjusted penetration was 22.9 dmm. This comparison shows that the SEBS increased the average adjusted penetration value to even a greater extent than did the PIB. It also shows that that it was extremely effective at decreasing the required blow time and in decreasing blow loss. It should also be noted that these excellent results were attained when the air blow modifier was incorporated into the asphalt flux at a level of only 1.5%. Accordingly, this series of experiments shows that excellent results can be attained in cases where a saturated rubbery polymer is used as an air blow modifier at a low level of less than 2 weight percent.

Examples 33-35

SEBS was evaluated as an air blow modifier in this series of experiments using the same equipment and general procedure as was used in Examples 1-13 except for a performance grade of asphalt flux being utilized as the starting material and except for the SEBS being substituted for the PIB evaluated in Examples 1-13. The percentage of highly saturated rubbery polymer (SEBS) added to the samples of asphalt flux, the level of blow loss experienced, and physical properties of the air blown asphalt samples made in this series of experiments are reported in Table 6.

TABLE 6

| Example | % SEBS | SP[1], °F. | Viscosity, cP[2] | Pen[3], dmm | FP[4], °F. | Blow Time, min. | Blow Loss | Adjusted Pen[5], dmm | Stain |
|---|---|---|---|---|---|---|---|---|---|
| 33 | 0 | 210.0 | 327.4 | 8.9 | >620 | 205 | 2.87 | 9.3 | 5 |
| 34 | 6 | 204.5 | 359.4 | 15.6 | >620 | 145 | 2.33 | 14.9 | 8 |
| 35 | 8 | 204.6 | 377.9 | 20.6 | 605 | 97 | 1.73 | 19.9 | 7 |

[1]Softening Point
[2]Viscosity was determined according to ASTM D4402 at 400° F. (204° C.)
[3]Penetration was measured following ASTM D5 (Standard Test Method for Penetration of Bituminous Materials) at 77° F. (25° C.)
[4]COC Flash Point
[5]Adjusted Penetration values were determined by interpolation or extrapolation to a softening point of 208° F. (98° C.)

Examples 33 was conducted as a control with no SEBS being added to the asphalt flux. In Example 34 the SEBS was included at a level of 6% and the adjusted penetration was 14.9 dmm. In Example 25 the SEBS was included at a level of 8% and the adjusted penetration was 19.9 dmm. It was accordingly again determined that adjusted penetration values increased with the level of SEBS present during the air blowing procedure. This series of experiments also shows that blow time and blow loss can also be reduced by increasing the level of SEBS utilized.

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing an industrial asphalt comprising sparging an oxygen containing gas through an asphalt flux in the presence of 0.25 weight percent to 5 weight percent of a highly saturated rubbery polymer at a temperature within the range of about 400° F. to about 550° F. for a period of time which is sufficient to increase the softening point of the asphalt flux to a value which is within the range of 190° F. to 220° F. and a penetration value which is within the range of 15 dmm to 25 dmm to produce the industrial asphalt.

2. The method of claim 1 wherein the asphalt flux is a hard asphalt flux.

3. The method as specified in claim 1 wherein the highly saturated rubbery polymer contains repeat units of the formula: —($CH_2$—$C(CH_3)_2$)—.

4. The method as specified in claim 1 wherein the highly saturated rubbery polymer is a styrene-ethylene/butylene-styrene rubber.

5. A method for preparing an industrial asphalt comprising sparging an oxygen containing gas through an asphalt flux in the presence of 0.25 weight percent to 5 weight percent of a highly saturated rubbery polymer at a temperature within the range of about 400° F. to about 550° F. for a period of time which is sufficient to increase the softening point of the asphalt flux to a value which is within the range of 185° F. to 250° F. and a penetration value of at least 15 dmm to 25 dmm to produce the industrial asphalt, wherein the highly saturated rubbery polymer is a styrene-ethylene/propylene-styrene rubber.

6. The method as specified in claim 1 wherein the oxygen containing gas is sparged through the asphalt flux for a period of time which is within the range of 2 hours to 8 hours.

7. The method as specified in claim 1 wherein asphalt flux is further comprised of an air blowing catalyst.

8. The industrial asphalt made by the process specified in claim 1.

9. A method for preparing an industrial asphalt comprising (1) heating an asphalt flux to a temperature of at least 120° F. to produce a hot asphalt flux, (2) adding from about 0.1 weight percent to 5 weight percent of a highly saturated rubbery polymer to the hot asphalt flux, (3) mixing the highly saturated rubbery polymer throughout the hot asphalt flux for a period of time which is within the range of about 10 minutes to about 10 hours at a temperature which is within the range of about 200° F. to 400° F. to prepare a highly saturated rubbery polymer modified asphalt flux, (4) heating the highly saturated rubbery polymer modified asphalt flux to a temperature which is within the range of about 400° F. to about 550° F. to produce a hot highly saturated rubbery polymer modified asphalt flux, (5) sparging an oxygen containing gas through the hot highly saturated rubbery polymer modified asphalt flux for a period of time-which is within the range of 2 hours to 8 hours and at a temperature which is within the range of about 400° F. to 550° F. to increase the softening point of the highly saturated rubbery polymer modified asphalt flux to a value which is within the range of 190° F. to 220° F. and a penetration value which is within the range of 15 dmm to 25 dmm to produce the industrial asphalt.

10. The method as specified in claim 9 wherein the highly saturated rubbery polymer contains repeat units of the formula: —(CH$_2$—C(CH$_3$)$_2$)—.

11. The method as specified in claim 9 wherein the highly saturated rubbery polymer is a styrene-ethylene/propylene-styrene rubber.

12. The method of claim 5 wherein the asphalt flux is a hard asphalt flux.

13. The method as specified in claim 5 wherein the oxygen containing gas is sparged through the asphalt flux for a period of time which is within the range of 2 hours to 8 hours.

14. The method as specified in claim 5 wherein asphalt flux is further comprised of an air blowing catalyst.

15. The industrial asphalt made by the process specified in claim 5.

16. The method of claim 9 wherein the asphalt flux is a hard asphalt flux.

17. The method as specified in claim 9 wherein the highly saturated rubbery polymer is a styrene-ethylene/butylene-styrene rubber.

18. The method as specified in claim 9 wherein asphalt flux is further comprised of an air blowing catalyst.

* * * * *